United States Patent
Pabbaraju et al.

(10) Patent No.: US 12,079,995 B2
(45) Date of Patent: Sep. 3, 2024

(54) SYSTEM AND METHOD FOR A HYBRID UNSUPERVISED SEMANTIC SEGMENTATION

(71) Applicant: Robert Bosch GmbH, Stuttgart (DE)

(72) Inventors: Chirag Pabbaraju, Sunnyvale, CA (US); João D. Semedo, Pittsburgh, PA (US); Wan-Yi Lin, Wexford, PA (US)

(73) Assignee: Robert Bosch GmbH (DE)

( * ) Notice: Subject to any disclaimer, the term of this patent is extended or adjusted under 35 U.S.C. 154(b) by 396 days.

(21) Appl. No.: 17/487,345

(22) Filed: Sep. 28, 2021

(65) Prior Publication Data

US 2023/0107917 A1 Apr. 6, 2023

(51) Int. Cl.
*G06T 7/10* (2017.01)
*G06T 7/11* (2017.01)
*G06T 7/269* (2017.01)

(52) U.S. Cl.
CPC ...... *G06T 7/10* (2017.01); *G06T 2207/20081* (2013.01); *G06T 2207/20084* (2013.01)

(58) Field of Classification Search
CPC ............. G06T 7/10; G06T 2207/20081; G06T 2207/20084; G06T 7/269; G06T 7/11
See application file for complete search history.

(56) References Cited

U.S. PATENT DOCUMENTS

| 2018/0205909 A1* | 7/2018 | Staranowicz | H04N 11/20 |
| 2019/0188863 A1* | 6/2019 | Ray | G06T 7/251 |
| 2021/0081677 A1* | 3/2021 | Wang | G06T 7/215 |
| 2021/0103770 A1* | 4/2021 | van Baar | G06V 40/10 |
| 2022/0156946 A1* | 5/2022 | Lin | G06T 3/60 |
| 2023/0148384 A1* | 5/2023 | Liu | G06N 20/00 |
| | | | 382/107 |

OTHER PUBLICATIONS

Pathake et al., "Learning Features by Watching Objects Move", arXiv:1612.06370v2 [cs.CV] Apr. 12, 2017, 10 pages.
Ji et al., "Invariant Information Clustering for Unsupervised Image Classification and Segmentation", arXiv:1807.06653v4 [cs.CV] Aug. 22, 2019, 10 pages.
Wang et al., "Learning Correspondence from the Cycle-consistency of Time", arXiv:1903.07593v2 [cs.CV] Apr. 2, 2019, 12 pages.
Cho et al., "PiCIE: Unsupervised Semantic Segmentation using Invariance and Equivariance in Clustering", arXiv:2103.17070v1 [cs.CV] Mar. 30, 2021, 20 pages.

* cited by examiner

*Primary Examiner* — Nancy Bitar
*Assistant Examiner* — Heath E. Wells
(74) *Attorney, Agent, or Firm* — Dickinson Wright PLLC

(57) ABSTRACT

A method of image segmentation includes receiving one or more images, determining a loss component, for each pixel one image of the one or more images, identifying a majority class and identify a cross-entropy loss between a network output and a target, randomly selecting pixels associated with the one image and select a second set of pixels to compute a super pixel loss for each pair of pixels, summing corresponding loss associated with each pair of pixels, for each corresponding frame of the plurality of frames of the image, computing a flow loss, a negative flow loss, a contrastive optical flow loss, and a equivariant optical flow loss, computing a final loss including a weighted average of the flow loss, the cross entropy loss, the super pixel loss, and foreground loss, updating a network parameter and outputting a trained neural network.

20 Claims, 9 Drawing Sheets

SYSTEM AND METHOD FOR A HYBRID UNSUPERVISED SEMANTIC SEGMENTATION

TECHNICAL FIELD

The present disclosure relates to image classification and segmentation, including those done via a machine learning network, such as a neural network.

BACKGROUND

Deep learning models have shown success in many computer vision tasks such as classification, object detection, and semantic segmentation that may seek to classify each pixel in the image. However, training these models requires a large number of annotated images for training, and the annotation process may be both expensive and error-prone, especially for semantic segmentation where exact boundaries of objects need to be labeled. On the other hand, unsupervised learning, which does not need annotated data, still may under-performs supervised methods.

SUMMARY

According to a first embodiment, a method of image segmentation includes receiving one or more images, wherein the one or more images includes a plurality of frames and no more than a partial annotation of the image, determining a loss component associated with the image segmentation model, for each pixel one image of the one or more images, identifying a majority class and identify a cross-entropy loss between a network output and a target, randomly selecting pixels associated with the one image and select a second set of pixels to compute a super pixel loss for each pair of pixels, summing corresponding loss associated with each pair of pixels, for each corresponding frame of the plurality of frames of the image, computing a positive flow loss, a negative flow loss, a contrastive optical flow loss, and a equivariant optical flow loss, computing a final loss including a weighted average of the positive flow loss, the negative flow loss, the contrastive optical flow loss, the equivariant optical flow loss, the cross entropy loss, the super pixel loss, and foreground loss, updating a network parameter associated with the image segmentation model in response to the final loss, and outputting a trained neural network utilizing the updated network parameter in response to exceeding a convergence threshold.

According to a second embodiment, a system for segmenting an image includes a sensor configured to generate one or more images, a controller in communication with the sensor and configured to receive one or more images, wherein the one or more images includes a plurality of frames and no more than a partial annotation of the image, form an image segmentation model associated with the image and determine a loss component associated with the image segmentation model, for each pixel one image of the one or more images, identify a majority class and identify a cross-entropy loss between a network output and a target; randomly select pixels associated with the one image and select a second set of pixels to compute a super pixel loss for each pair of pixels via calculating a sum corresponding to loss associated with each pair of pixels; for each corresponding frame of the plurality of frames of the image, compute an optical flow loss, compute a final loss that includes a weighted average of the optical flow loss, the cross entropy loss, the super pixel loss, paired foreground loss, and pseudo-label loss; update a network parameter associated with the image segmentation model in response to the final loss; and output a trained neural network utilizing the updated network parameter in response to exceeding a convergence threshold.

According to a third embodiment, a method of image segmentation includes receiving an image, wherein the image includes no more than a partial annotation of the image, forming an image segmentation model associated with the image and determine a loss component associated with the image segmentation model, computing a final loss based on a weighted average of the loss component, a super pixel loss, a regularization loss, an optical flow loss, updating a network parameter associated with the image segmentation model in response to the final loss, and outputting a trained neural network utilizing the network parameter and in response to exceeding a convergence threshold.

DETAILED DESCRIPTION

Figure 1:
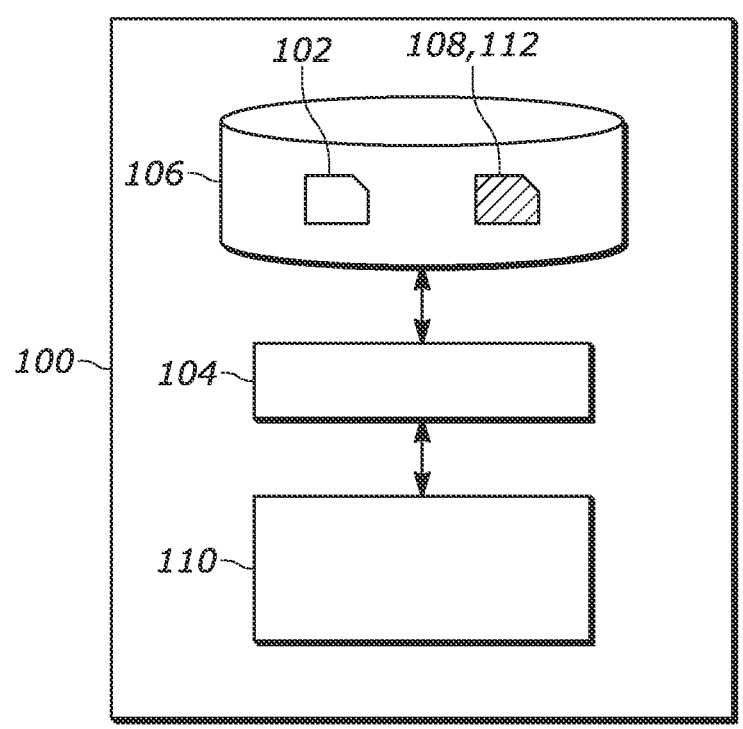
FIG. 1 shows a system 100 for training a neural network.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The system and method associated with the hybrid segmentation model may propose to train an unsupervised image semantic segmentation model by incorporating the outputs of classic computer vision algorithms, in both the spatial (super pixels and dense conditional random fields) and temporal (optical flow and foreground segmentation) domains, into the loss function. Such a system and method may have additional losses based on classic computer vision algorithms while utilizing temporal information, as opposed to other methods. The system and method described below may perform semantic segmentation with multiple classes and multiple objects per image.

This system and method associated with the hybrid segmentation model may provide better whole-image semantic segmentation with unsupervised learning over the state of the art. This may have particular advantages when large amounts of unlabeled data (e.g., videos without annotations) are available for training the segmentation model.

The system and method associated with the hybrid segmentation model may aim to improve the performance of unsupervised learning for image semantic segmentation by utilizing temporal information of video data as well as spatial information extracted from classic computer vision algorithms. The inputs may include a video or image data set D, that may include partial annotations or no annotations. The inputs may also include C as a number of classes or a set of classes. An image semantic segmentation model may be described as model $f_\theta$.

The loss components may include losses such as those described in an unsupervised image classification and segmentation utilizing invariant information clustering majority-vote super pixel loss, sampling-based superpixel loss, dense conditional random fields (DenseCRF) loss, Optical flow loss, and foreground loss. With respect to majority-vote Superpixel loss $L_{mv\ superpixel}$, for each superpixel in the image, the system may determine the most voted class in the model output across all pixels in the superpixel. For each pixel in an image, use the most voted class of the corresponding superpixel as a target. The system may compute the cross-entropy (CE) between the model output and the targets constructed in this way. The Dense CRF loss may, for a given image x and a segmentation map $f_\theta(x)$, re-assign the class of each pixel in the segmentation map to maximize an energy function E which reflects appearance similarity for pixels with the same class label. With respect to optical flow, given two images $x^{(1)}$, $x^{(2)}$, for each pixel $x_{i^{(1)},j^{(1)}}$ in $x^{(1)}$, optical flow finds the corresponding pixel $x_{i^{(2)},j^{(2)}}$ in $x^{(2)}$, e.g., $OP(x^{(1)} \to x^{(2)}) \in R^{w \times h}$, and $OP(x^{(1)} \to x^{(2)})_{i^{(1)},j^{(1)}} + (i_{(1)}, j^{(1)}) = (i^{(2)}, j^{(2)})$ where $OP(x^{(1)} \to x^{(2)})_{i^{(1)},j^{(1)}}$ is the $(i^{(1)}, j^{(1)})$ location of $OP(x^{(1)} \to x^2)$. With respect to a background foreground segmentation, given a sequence of images (frames) $[x_1, \ldots, x_k]$ in a video captured by static camera, the system may learn the common background of these images; then assign foreground or background class to each pixel in $[x_1, \ldots, x_k]$. The system may denote these pixel-level foreground-background segmentation maps as $[b_1, \ldots, b_k]$.

With respect to sampling-based superpixel loss $L_{sb\ superpixel}$, given two pixels $x_{i,j}$ and $x_{k,g}$ that belong to the same super pixel, the super pixel loss may compute the cross-entropy (CE) between the corresponding logits (let $z_{i,j}$ be the logits for $x_{i,j}$, and $z_{k,g}$ bet the logits for $x_{k,g}$, $$L_{superpixel}(z_{i,j}, z_{k,g}) = -\sum_{n=1}^{c} z_{i,j}^n \times \log(z_{k,g}^n).$$

With respect to DenseCRF loss $L_{crf}$, the system may use the energy value computed by DenseCRF as the DenseCRF loss $L_{crf}(f_\theta)$. With respect to optical flow loss, the system may propose three optical flow losses based on positive pixel pairs and negative pixel pairs.

With respect to a positive pixel pair, for two pixels $x_{i^{(1)},j^{(1)}}$ and $x_{k^{(1)},g^{(1)}}$ that belong to the same super pixel in image $x^{(1)}$ and their corresponding pixels $x_{i^{(2)},j^{(2)}}$ and $x_{k^{(2)},g^{(2)}}$ in image $x^{(2)}$, if $x_{i^{(2)},j^{(2)}}$ and $x_{k^{(2)},g^{(2)}}$ also belongto the same super pixel, then $(x_{i^{(1)},j^{(1)}}, x_{i^{(2)},j^{(2)}})$ and $(x_{k^{(1)},g^{(1)}}, x_{k^{(2)},g^{(2)}})$ may form two positive pixel pairs. With respect to a negative pixel pair, for two pixels $x_{i^{(1)},j^{(1)}}$ and $x_{k^{(1)},g^{(1)}}$ that belong to different super pixels in image $x^{(1)}$ and their corresponding flow vectors $v_{i^{(1)},j^{(1)}}$ and $v_{k^{(1)},g^{(1)}}$, compute the difference between the magnitude (e.g., as given by the L2 norm) of the two flow vectors. If the difference in magnitude is above a pre-defined threshold T, $(x_{i^{(1)},j^{(1)}}, x_{k^{(1)},g^{(1)}})$ form a negative pair.

The system and method may also calculate a positive optical flow loss $L_{OP}$. Thus, given a positive pixel pair $(x_{i^{(1)},j^{(1)}}, x_{k^{(1)},g^{(1)}})$, the positive optical flow loss $L_{OP} = CE(z_{i^{(1)},j^{(1)}}, z_{k^{(1)},g^{(1)}})$ where CE is the cross entropy function as described above, and $z_{i^{(1)},j^{(1)}}$, $z_{k^{(1)},g^{(1)}}$ are the logits of $x_{i^{(1)},j^{(1)}}$ and $x_{k^{(1)},g^{(1)}}$ respectively.

The system and method may also calculate a negative optical flow loss $L_{ON}$. Given a negative pixel pair $(x_{i^{(1)},j^{(1)}}, x_{k^{(1)},g^{(1)}})$, then $L_{ON} = -CE(z_{i^{(2)},j^{(2)}}, z_{k^{(2)},g^{(2)}})$ where CE is the cross entropy function as described above, and $z_{i^{(1)},j^{(1)}}$, $z_{k^{(1)},g^{(1)}}$ are the to its of $x_{i^{(1)},j^{(1)}}$ and $x_{k^{(1)},g^{(1)}}$, respectively.

The system and method may also calculate a contrastive optical flow loss $L_{OC}$. Given all pixels in one super pixel, select $K_p$ positive pairs within the super pixel, and $K_n$ negative pairs in which one of the pixels in the pair is in this super pixel, the contrastive loss is defined as $$L_{OC} = \frac{\sum_{K_p} L_{OP}(\text{positive}_{pairs})}{\sum_{K_n} L_{NP}(\text{negative}_{pairs})}$$

The system and method may also calculate a equivariant optical flow loss $L_{OE}$. The system may compute optical flow $OP(x^{(2)} \to x^{(1)})$ and $f_\theta(x^{(2)})$ then construct $y'^{\{(1)\}}$ as follows: the logit value of $OP(x^{(2)} \to x^{(1)})_{i,j} + (i, j)$ location equals to $f_\theta(x^{(2)})i, j$. $L_{OE}(x^{(1)}, x^{(2)}) = CE(y'^{(1)}, f_\theta(x^{(1)}))$ The system may include two types of foreground loss. For a first, paired foreground loss, given the image x and its foreground-background segmentation map b, sample K pairs of pixels $[(x_b^1, x_f^1), \ldots, (x_b^K, x_f^K)]$ from x, where $x_b^1, \ldots, x_b^K$ are background pixels and $x_f^1, \ldots, x_f^K$ are foreground pixels. The paired foreground loss is $$0 - \sum_{i=1}^{K} CE(x_b^I, x_f^i)$$

With respect to a pseudo-label loss, the system may create an auxiliary task to segment pixels into foreground and background, using the pre-computed map b as pseudo-label. The loss may be the sum of cross-entropy loss of all pixels.

For each image x in D, the system and method may compute $f_\theta(x)$, then compute the loss component associated with hat model. The system and method may also compute the following losses: a majority-vote super pixel loss, a sampling-based superpixel loss, and a DenseCRF loss. The majority-vote Superpixel loss may, for all pixels in the image, set the most voted class in the corresponding superpixels as the target. Compute $L_{mv\ superpixel}$ as the cross-entropy loss between the network output and the targets constructed in this way. Sampling-based superpixel loss may randomly select KS pixels over x. For each pixel in the KS pixels, the system may select another pixel that belong to the same super pixel, compute $L_{sb\ superpixel}$ for each pair of pixels and sum the corresponding losses. With respect to DenseCRF loss, the system may compute $L_{crf}(f_\theta(x))$.

If D is a video dataset, the system may load the next frame, x', with respect to x, and compute the positive flow loss, the negative flow loss, the contrastive optical flow loss, and equivariant optical flow loss. The positive flow loss may randomly select $K_o$ pixels over x; for each pixel in the $K_o$ pixels, select another pixel to make a positive pair. The system may compute $L_{OP}$ for all positive pairs and sum the loss up. The negative flow loss may randomly select $K_n$ pixels over x; for each pixel in the $K_n$ pixels, select another pixel to make a negative pair. The system may compute $L_{ON}$ for all positive pairs and sum the loss up. The contrastive optical flow loss may randomly select $K_c$ pixels over x; for each super pixel that these $K_c$ pixels belong, compute $L_{OC}$ and sum them up. The system may calculate equivariant optical flow loss, which is computed as $L_{OE}(x, x')$. The system may then compute a final loss which is a weighted average of all the losses computed. The system may then update parameter set θ using the final loss computed and an appropriate optimizer.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation, and a part of the input of the stack of layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ("TO") interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyperparameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
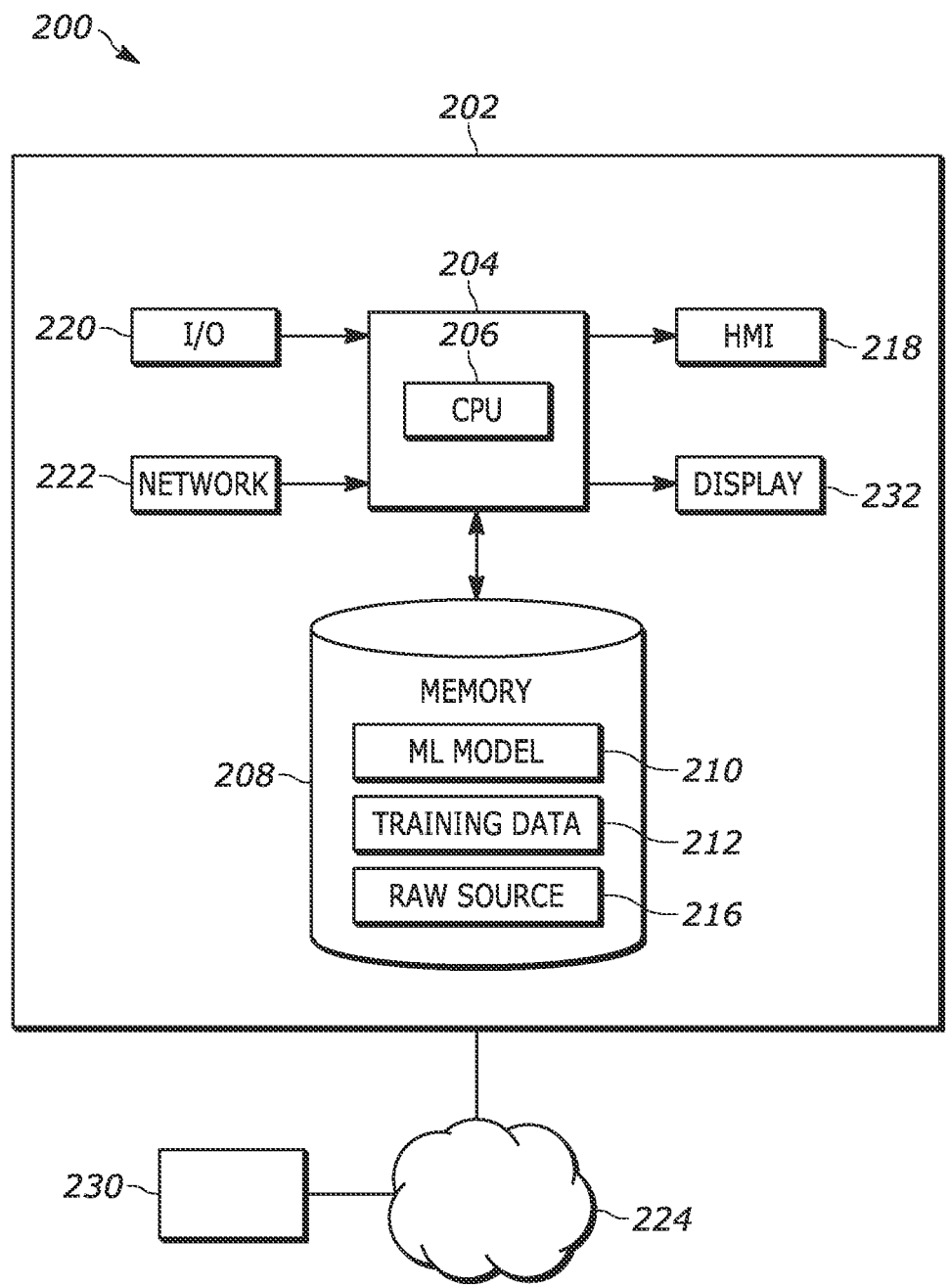
FIG. 2 shows a computer-implemented method 200 for training a neural network.

FIG. 2 depicts a data annotation system 200 to implement a system for annotating data. The data annotation system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 215.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 330 may be in communication with the external network 224.

The computing system 202 may include an input/output (VO) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 215. The raw source dataset 215 may include raw or unprocessed sensor data that may be representative of an input dataset for a machine-learning system. The raw source dataset 215 may include video, video segments, images, text-based information, and raw or partially processed sensor data (e.g., radar map of objects). In some examples, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 215. The raw source data 215 may include a plurality of instances or input dataset for which annotation results are desired. For example, the machine-learning algorithm 210 may be configured to identify the presence of a pedestrian in video images and annotate the occurrences. The machine-learning algorithm 210 may be programmed to process the raw source data 215 to identify the presence of the particular features. The machine-learning algorithm 210 may be configured to identify a feature in the raw source data 215 as a predetermined feature (e.g., pedestrian). The raw source data 215 may be derived from a variety of sources. For example, the raw source data 215 may be actual input data collected by a machine-learning system. The raw source data 215 may be machine generated for testing the system. As an example, the raw source data 215 may include raw video images from a camera.

In the example, the machine-learning algorithm 210 may process raw source data 215 and output an indication of a representation of an image. The output may also include augmented representation of the image. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

Figure 3:
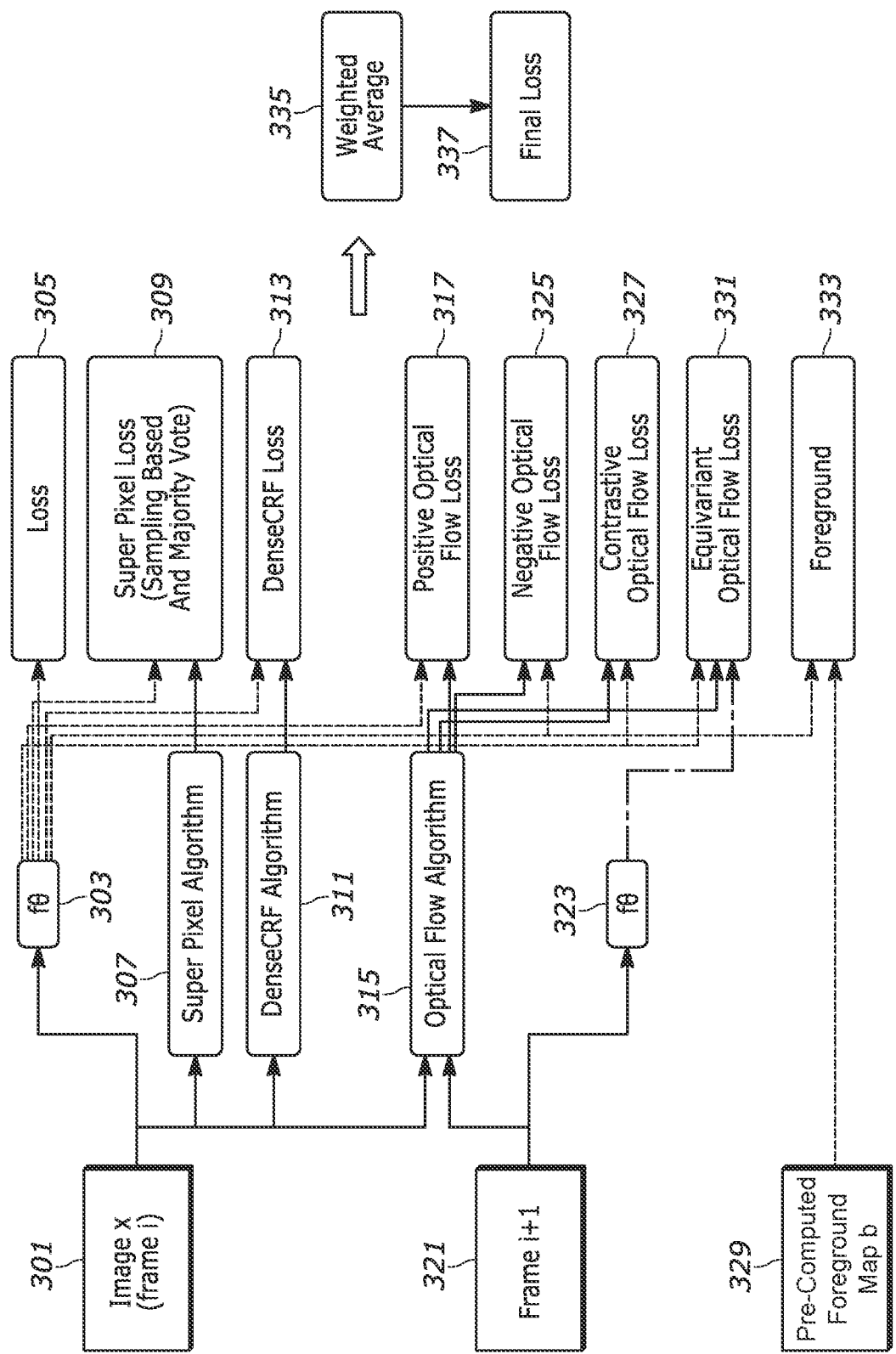
FIG. 3 illustrates a flow chart of a hybrid unsupervised semantic segmentation.

FIG. 3 illustrates an overview of a hybrid unsupervised semantic segmentation flow chart. The system may receive one or more images x with a corresponding plurality of frames, with each frame i. Thus, the frames and images may make a video. An image semantic segmentation model ($f_\theta$) 303,323 may seek solutions to the following problem: given an image 301 $x \in R^{w \times h}$ and set of classes C, classify each pixel in x to a class in C, e.g., $f_\theta(x) \in C^{w \times h}$.

The system may include a super pixel algorithm 307. Super pixel algorithms may group neighboring pixels with similar pixel values to one super pixels. Given input image $x \in R^{w \times h}$ and the number of super pixels $N_s$, the output of a super-pixel algorithm $P \in N_s^{w \times h}$ where pixel locations with the same super-pixel label are connected, e.g., if $P_{i,j}=k$, then one of $P_{i-1,j}$, $P_{i+1,j}$, $P_{i,j+1}$, $P_{i,j-1}=k$ $\forall P_{i,j in P}$. The system may calcluate the super pixel loss 309 based on sampling based on a majority vote.

The system may include a DenseCRF algorithm 311. Given the image x and the segmentation map $f_\theta(x)$, DenseCRF re-assign the class of each pixel in $f_\theta(x)$ to maximize an energy function E which reflects appearance similarity for pixels with the same class label. The system may calculate a DenseCRF loss 313.

The system may include an optical flow algorithm 315. Given two images $x^{(1)}$, $x^{(2)}$, for each pixel $x_{i^{(1)},j^{(1)}}^{(1)}$ in $x^{(1)}$, optical flow finds the corresponding pixel $x_{i^{(2)},j^{(2)}}^{(2)}$ in $x^{(2)}$, i.e. $OP(x^{(1)} \to x^{(2)}) \in R^{w \times h}$ and $OP(x^{(1)} \to x^{(2)})_{i^{(1)},j^{(1)}} + (i^{(1)}, j^{(1)}) = (i^{(2)}, j^{(2)})$ where $OP(x^{(1)} \to x^{(2)})_{i^{(1)},j^{(1)}}$ is the $(i^{(1)}, j^{(1)})$ location of $OP(x^{(1)} \to x^{(2)})$. The optical flow algorithm 315 may compute both a positive optical flow loss 317 and a negative optical flow loss 325.

The system 300 may load the next frame 321 for the model 323 and compute another subset of losses. Given a sequence of images (frames) $[x_1, \ldots, x_k]$ in a video captured by a camera (e.g., static camera), the system may learn the common background of these images, then assign foreground or background class to each pixel in $[x_1, \ldots, x_k]$. The system may denote these pixel-level foreground-background segmentation maps as $[b_1, \ldots, b_k]$. For the frames, the system may identify and compute various losses that may include both the positive optical flow loss 317 and the negative optical flow loss 325, contrastive optical flow loss 327, and equivariant optical flow loss 331.

The system may pre-compute the foreground map at step 329. For background foreground segmentation, given a sequence of images (frames) $[x_1, \ldots, x_k]$ in a video captured by static camera, the system may learn the common background of these images. The system may then assign foreground or background class to each pixel in $[x_1, \ldots, x_k]$. The deontation of these pixel-level foreground-background segmentation maps as $[b_1, \ldots, b_k]$. The system may compute a foreground loss 333. For a first, paired foreground loss, given the image x 301 and its foreground-background segmentation map b, sample K pairs of pixels $[(x_b^1, x_f^1), \ldots, (x_b^K, x_f^K)]$ from x, where $x_b^1, \ldots, x_b^K$ are background pixels and $x_f^1, \ldots, x_f^K$ are foreground pixels. The paired foreground loss is $$0 - \sum_{i=1}^{K} CE(x_b^i, x_f^i).$$

With respect to a pseudo-label loss, the system may create an auxiliary task to segment pixels into foreground and background, using the pre-computed map b as pseudo-label. The loss may be the sum of cross-entropy loss of all pixels. At step 335, the system may sum all of the losses computed and then identify a weighted average 335 to compute a final loss 337. The final loss 337 may be utilized to update a parameter of the model 303 or machine learning network, as well as updating an optimizer.

Figure 4:
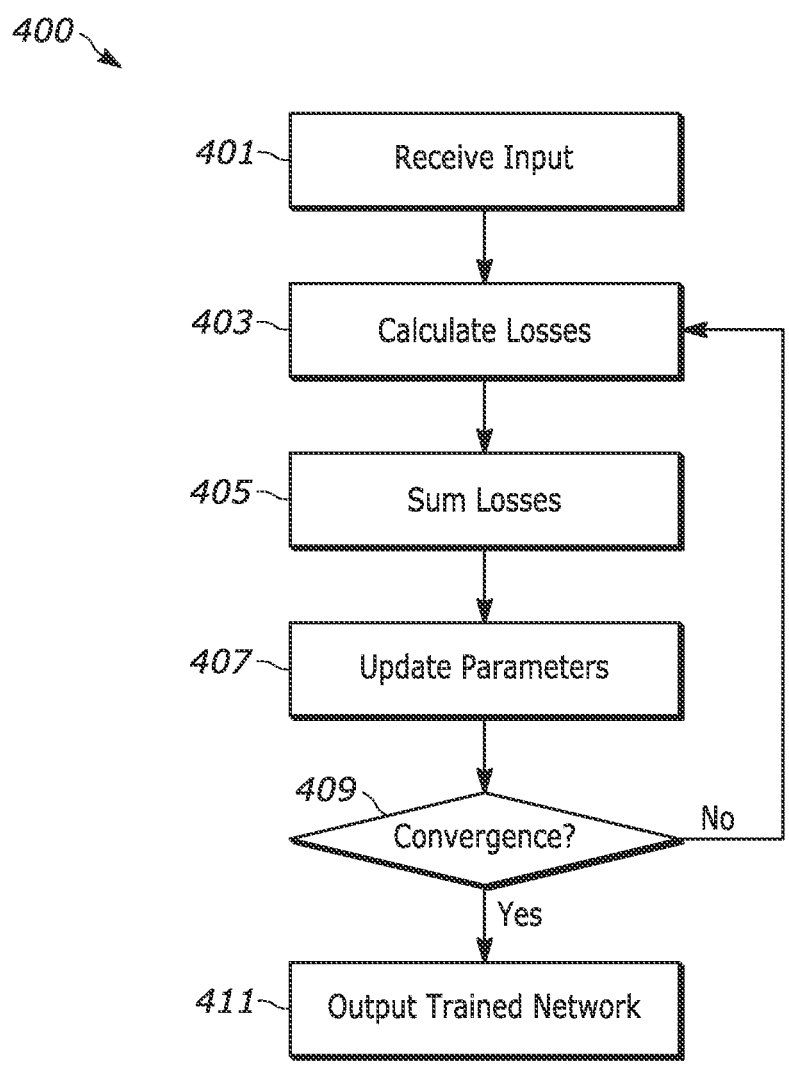
FIG. 4 illustrates a flow chart for training a network utilizing the hybrid unsupervised semantic segmentation.

FIG. 4 illustrates an example flow chart 400 of a hybrid unsupervised semantic segmentation. At step 401, the system may receive input that may include images, video, or other data as described above. The input may have partial annotation or no annotation. At step 403, the system may run the various algorithms and calculate the losses as associated with those algorithms described in FIG. 3. At step 405, the system may sum the losses as described in FIG. 3. The system may also weight the average of the losses and compute a final loss. Utilizing the loss, the system may update the network parameters of the model in step 407. The update can be used in any existing model or network (e.g. neural network, convolutional neural network, machine learning network, deep learning network, etc.). The system may then repeat this training of the data for various iterations until convergence is met. Thus, the system may determine if convergence is met at step 409. If convergence in not met, the system may calculate losses on a new parameter. The system may determine that convergence is met based on a threshold or another attribute. For example, the threshold utilized for convergence may be met by a defined number of iterations, an amount of error loss, the amount of error classification, loss value (e.g., average or sum), or other attributes. When convergence is met, the system may output trained network at step 411. Thus, the neural network may be trained to train an unsupervised image semantic segmentation model.

Figure 5:
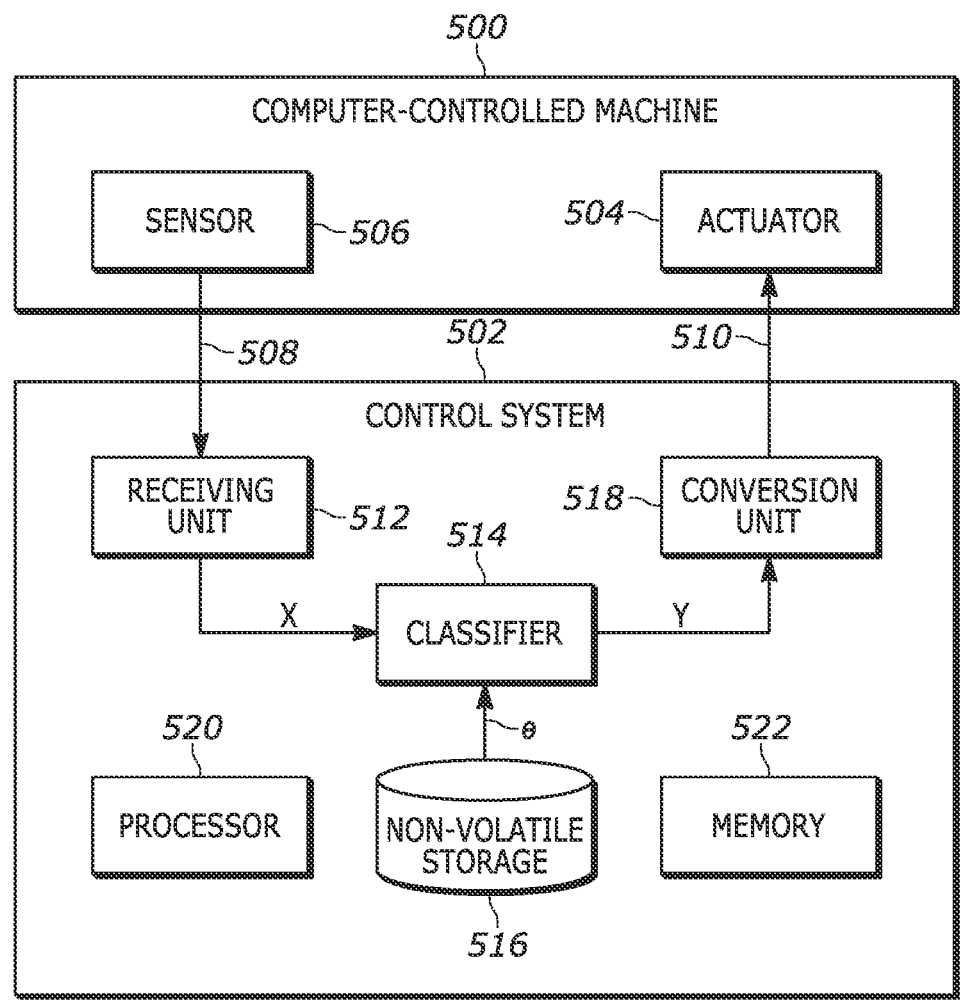
FIG. 5 depicts a schematic diagram of an interaction between computer-controlled machine 10 and control system 12.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals Y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
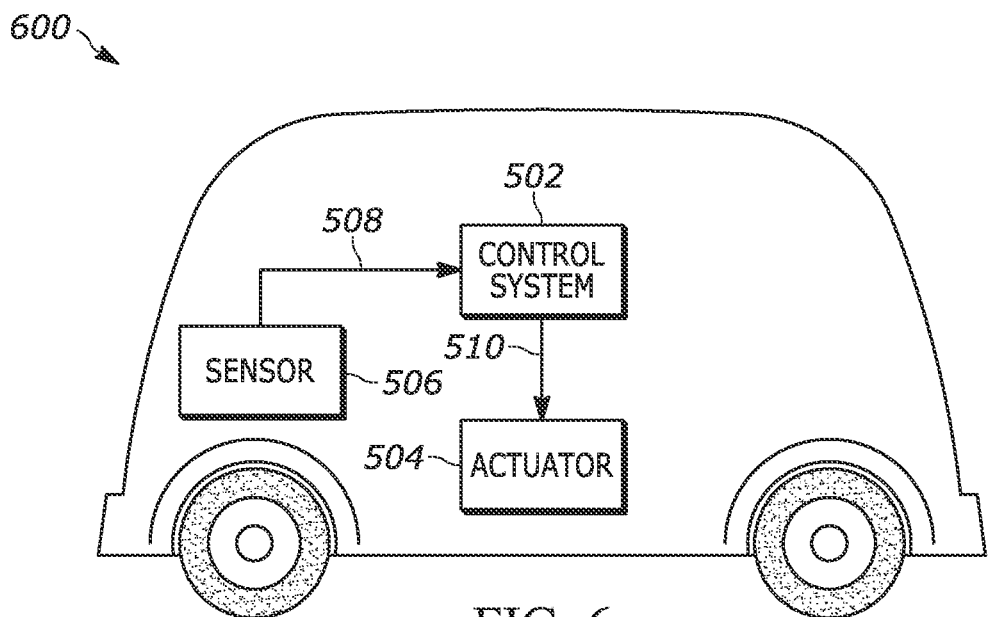
FIG. 6 depicts a schematic diagram of the control system of FIG. 1 configured to control a vehicle, which may be a partially autonomous vehicle or a partially autonomous robot.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
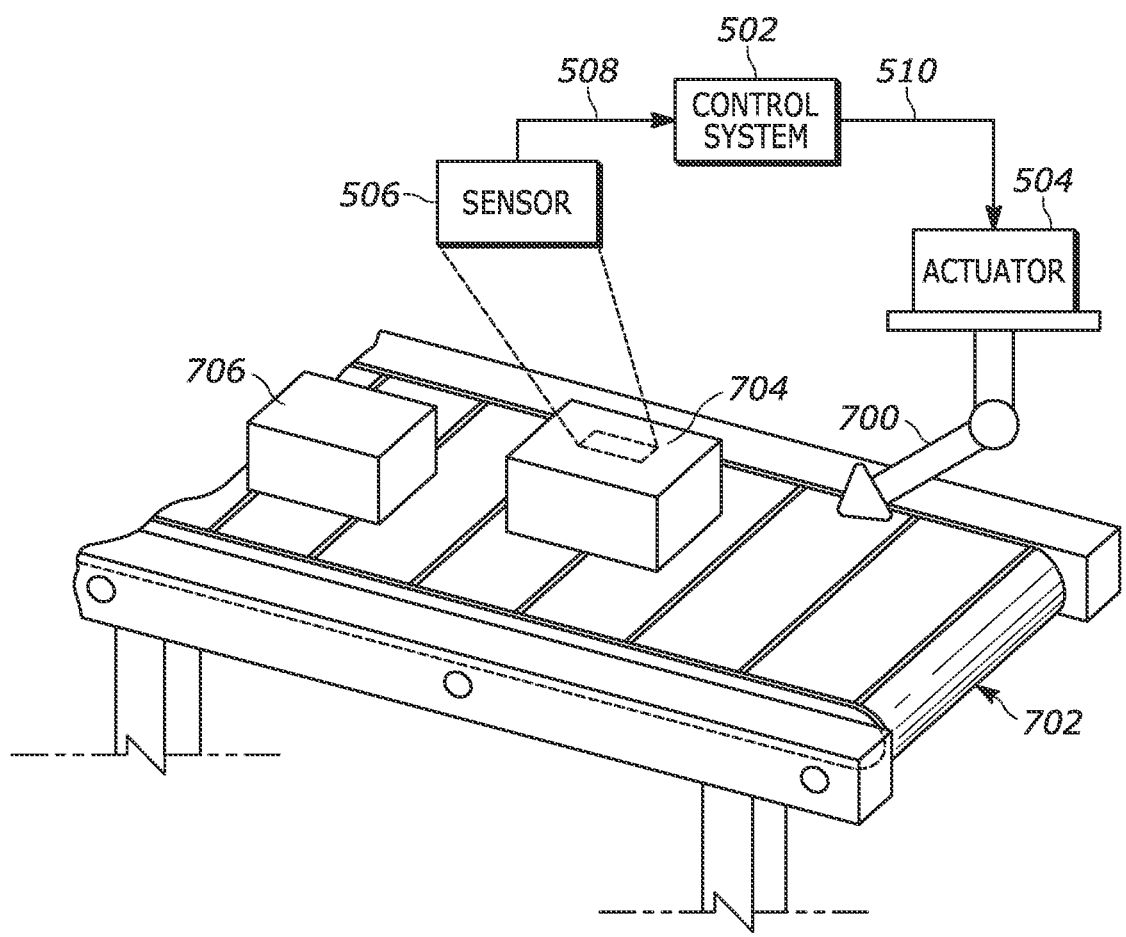
FIG. 7 depicts a schematic diagram of the control system of FIG. 1 configured to control a manufacturing machine, such as a punch cutter, a cutter or a gun drill, of manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 106 of system 700 (e.g., manufacturing machine) depending on the determined state of manufactured product 704.

Figure 8:
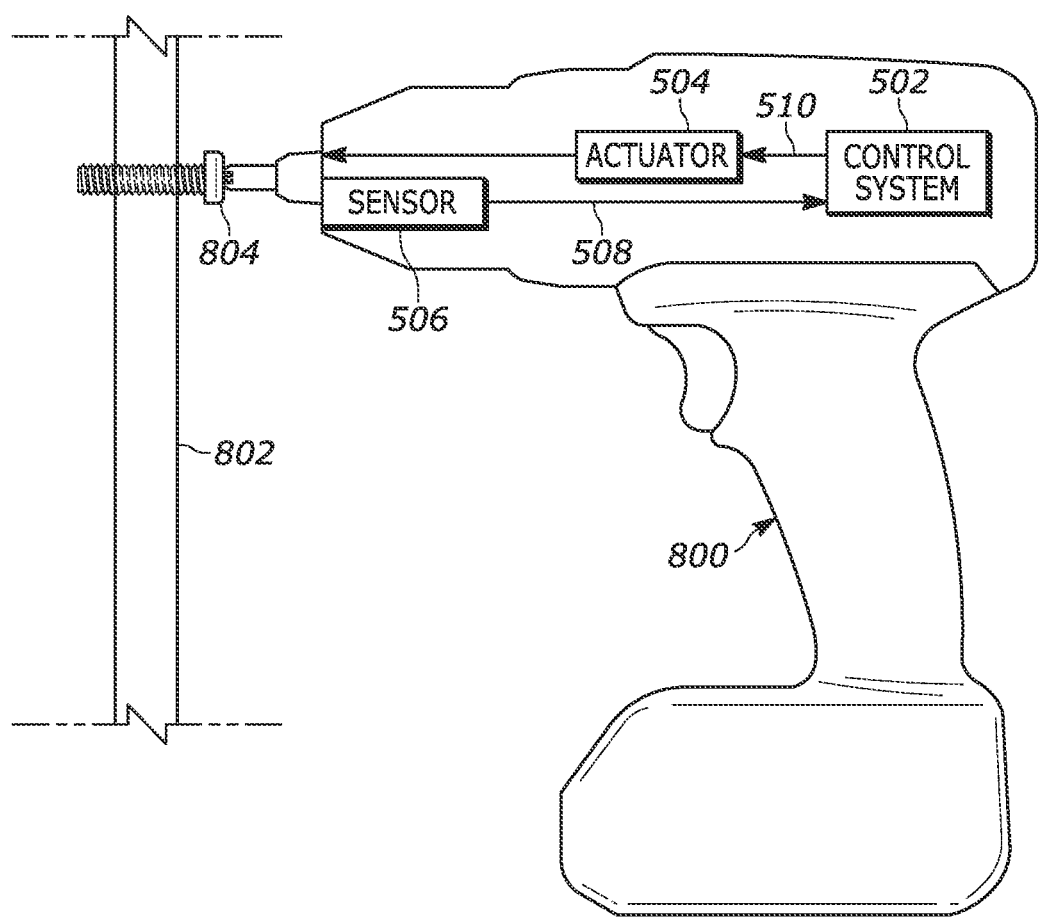
FIG. 8 depicts a schematic diagram of the control system of FIG. 1 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
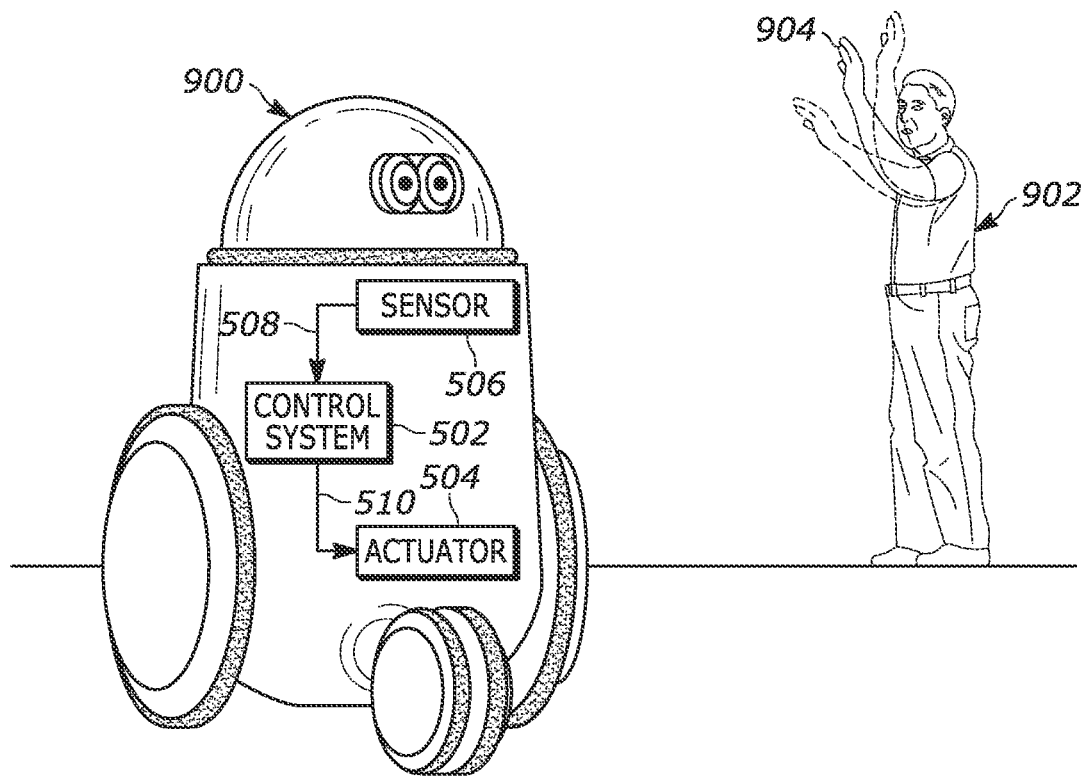
FIG. 9 depicts a schematic diagram of the control system of FIG. 1 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
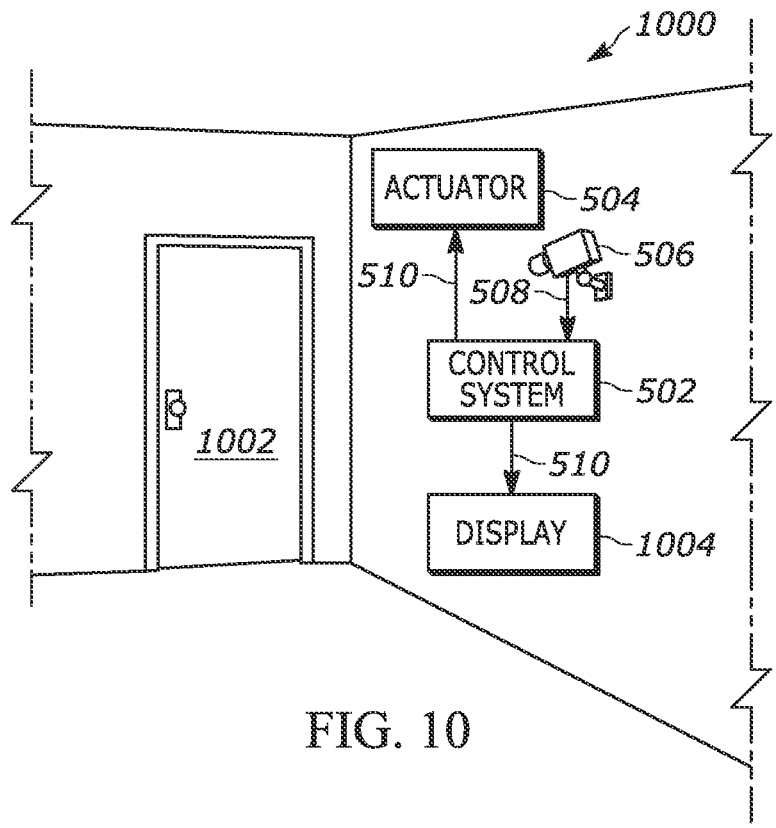
FIG. 10 depicts a schematic diagram of the control system of FIG. 1 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may identify adversarial perturbations or random perturbations (e.g., bad shadows or lighting) in the video of the environment.

Figure 11:
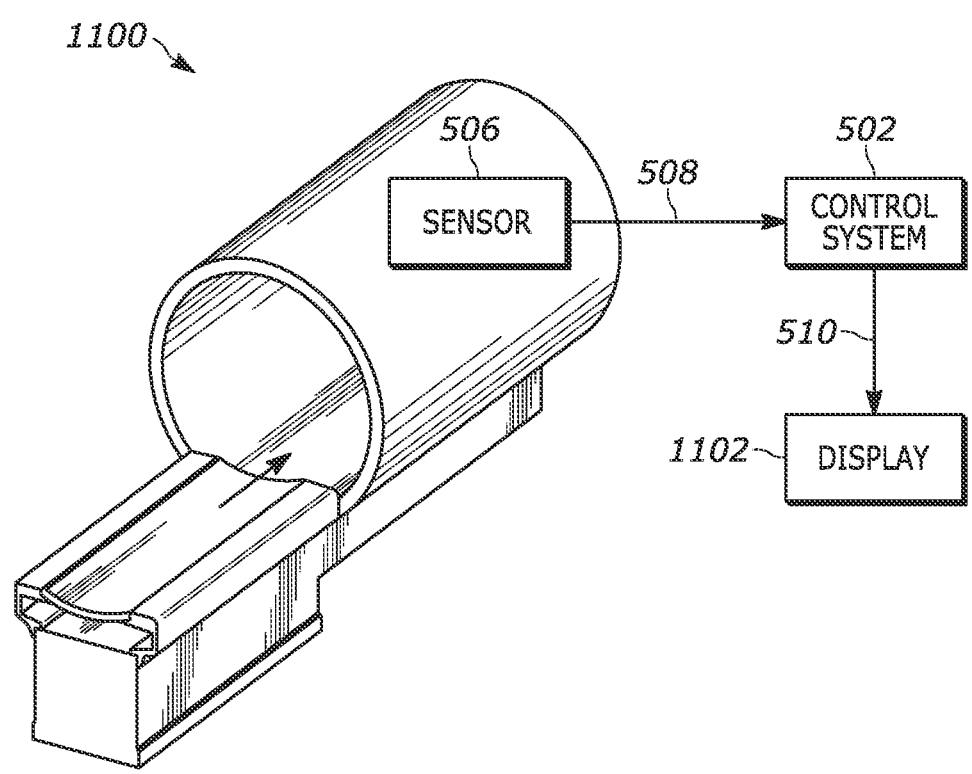
FIG. 11 depicts a schematic diagram of the control system of FIG. 1 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 302 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of image segmentation comprising:
receiving one or more images, wherein the one or more images includes a plurality of frames and no more than a partial annotation of the one or more images;
determining a loss component associated with a image segmentation model;
for each pixel of the one or more images, identifying a majority class and identify a cross-entropy loss between a network output and a target;
randomly selecting pixels associated with the one image and select a second set of pixels to compute a super pixel loss for each pair of pixels;
summing corresponding loss associated with each pair of pixels;
for each corresponding frame of the plurality of frames of the image, computing a positive flow loss, a negative flow loss, a contrastive optical flow loss, and a equivariant optical flow loss;
computing a final loss including a weighted average of the positive flow loss, the negative flow loss, the contrastive optical flow loss, the equivariant optical flow loss, the cross entropy loss, the super pixel loss, and foreground loss;
updating a network parameter associated with the image segmentation model in response to the final loss; and
outputting a trained neural network utilizing the updated network parameter in response to exceeding a convergence threshold.

2. The method of claim 1, wherein the positive flow loss is configured to randomly select pixels over one of the images, and for each pixel, select another pixel to create a positive pair to sum an aggregate positive flow loss across all of the one or more images.

3. The method of claim 1, wherein the image is LIDAR, radar, sonar, thermal, heat, or temperature image.

4. The method of claim 1, wherein the foreground loss includes a paired foreground loss and a pseudo-label loss.

5. The method of claim 1, wherein the loss component includes utilizing two different augmentation versions of the image in computing the loss component.

6. A system for segmenting an image, comprising:
a sensor configured to generate one or more images;
a controller in communication with the sensor and configured to,
receive one or more images, wherein the one or more images includes a plurality of frames and no more than a partial annotation of the image;
form an image segmentation model associated with the image and determine a loss component associated with the image segmentation model;
for each pixel of the one or more images, identify a majority class and identify a cross-entropy loss between a network output and a target;
randomly select pixels associated with the one image and select a second set of pixels to compute a super pixel loss for each pair of pixels via calculating a sum corresponding to loss associated with each pair of pixels;
for each corresponding frame of the plurality of frames of the image, compute an optical flow loss;
compute a final loss that includes a weighted average of the optical flow loss, the cross entropy loss, the super pixel loss, paired foreground loss, and pseudo-label loss;
update a network parameter associated with the image segmentation model in response to the final loss; and output a trained neural network utilizing the updated network parameter in response to exceeding a convergence threshold.

7. The system of claim 6, wherein the optical flow loss includes a positive flow loss, a negative flow loss, a contrastive optical flow loss, and an equivariant optical flow loss.

8. The system of claim 7, wherein the image does not include any annotation.

9. A method of image segmentation, comprising:
receiving an image, wherein the image includes no more than a partial annotation of the image;
forming an image segmentation model associated with the image and determine a loss component associated with the image segmentation model;
computing a final loss based on a weighted average of the loss component, a super pixel loss, a regularization loss, an optical flow loss;
updating a network parameter associated with the image segmentation model in response to the final loss; and
outputting a trained neural network utilizing the network parameter and in response to exceeding a convergence threshold.

10. The method of claim 9, wherein the regularization loss is a dense conditional random field (DenseCRF) loss.

11. The method of claim 9, wherein the final loss includes a weight average of each loss.

12. The method of claim 9, wherein the image includes video, radar, LiDar, ultrasonic, motion, or thermal images.

13. The method of claim 9, wherein the trained neural network includes an unsupervised image semantic segmentation model.

14. The method of claim 9, wherein the method includes, for each pixel in the image, identify a majority class and identify a cross-entropy loss between a network output and a target.

15. The method of claim 9, wherein the super pixel loss includes utilizing randomly selected pixels associated with the image and select a second set of pixels to compute the super pixel loss for each pair of pixels.

16. The method of claim 9, wherein the optical flow loss includes a positive optical flow loss, negative optical flow loss, and contrastive optical flow loss.

17. The method of claim 9, wherein the image does not include any annotation.

18. The method of claim 9, wherein the method includes computing a foreground loss and utilizing the foreground loss to compute the final loss.

19. The method of claim 18, wherein the foreground loss includes a paired foreground loss and a pseud-label loss.

20. The method of claim 9, wherein the super pixel loss includes majority-vote superpixel loss and sampling-based superpixel loss.

* * * * *